(12) United States Patent
Morkovsky et al.

(10) Patent No.: US 8,431,009 B2
(45) Date of Patent: Apr. 30, 2013

(54) ELECTROCOAGULATION REACTOR

(75) Inventors: Paul E. Morkovsky, Shiner, TX (US); Douglas D. Kaspar, Shiner, TX (US)

(73) Assignee: Kaspar Electroplating Corporation, Shiner, TX (US)

( * ) Notice: Subject to any disclaimer, the term of this patent is extended or adjusted under 35 U.S.C. 154(b) by 1365 days.

(21) Appl. No.: 11/581,695

(22) Filed: Oct. 16, 2006

(65) Prior Publication Data

US 2007/0068826 A1    Mar. 29, 2007

Related U.S. Application Data

(63) Continuation of application No. 10/171,926, filed on Jun. 14, 2002.

(60) Provisional application No. 60/318,729, filed on Sep. 12, 2001.

(51) Int. Cl.
*C02F 1/463* (2006.01)

(52) U.S. Cl.
USPC ............ 205/742; 205/751; 205/755; 205/761

(58) Field of Classification Search .................. 205/742, 205/751, 755, 761
See application file for complete search history.

(56) References Cited

U.S. PATENT DOCUMENTS

| | | | |
|---|---|---|---|
| 672,231 A | 4/1901 | Lacomme | |
| 820,113 A | 5/1906 | Hinkson | |
| 2,864,750 A | 12/1958 | Hughes, Jr. et al. | |
| 3,247,901 A | 4/1966 | Stuetzer | |
| 3,314,872 A | 4/1967 | Waterman et al. | |
| 3,679,556 A | 7/1972 | Doevenspeck | |
| 3,766,037 A | 10/1973 | Lee | |
| 3,849,281 A | 11/1974 | Bennett et al. | |
| 3,925,176 A | 12/1975 | Okert | |
| 3,964,991 A | 6/1976 | Sullins | |
| 3,975,795 A | 8/1976 | Kupcikevicius et al. | |
| 4,073,712 A | 2/1978 | Means et al. | |
| 4,085,028 A | 4/1978 | McCallum | |
| 4,124,480 A | 11/1978 | Stevenson | |
| 4,175,026 A | 11/1979 | Houseman | |
| 4,272,369 A | 6/1981 | Love | |
| 4,293,400 A | 10/1981 | Liggett | |
| 4,339,324 A | 7/1982 | Haas | |
| 4,347,110 A | 8/1982 | Joyce | |
| 4,378,276 A | 3/1983 | Liggett et al. | |
| 4,406,768 A | 9/1983 | King | |
| 4,500,403 A | 2/1985 | King | |

(Continued)

FOREIGN PATENT DOCUMENTS

| | | |
|---|---|---|
| EP | 0794157 A1 | 9/1997 |
| FR | 2707282 | 1/1995 |
| WO | WO 91/13029 | 9/1991 |
| WO | WO 96/40591 | 12/1996 |

*Primary Examiner* — Arun S Phasge
(74) *Attorney, Agent, or Firm* — Jackson Walker, LLP

(57) ABSTRACT

An electrocoagulation reactor is provided for treating waste water and removing contaminants therefrom. The reactor is typically a six sided rectangular water tight housing which has an inlet pipe and an outlet pipe. There are a multiplicity of charged plates located parallel to one another within the housing. Adjacent plates are typically oppositely charged and water will pass between the plates as it flows through the reactor. The electric field between the plates will help encourage coagulation of waste matter which then may be removed from the waste water downstream of the electrocoagulation reactor.

12 Claims, 19 Drawing Sheets

U.S. PATENT DOCUMENTS

| | | |
|---|---|---|
| 4,789,450 A | 12/1988 | Paterson |
| 4,790,923 A | 12/1988 | Stillman |
| 4,872,959 A | 10/1989 | Herbst et al. |
| 4,902,391 A | 2/1990 | Ibbott |
| 5,043,050 A | 8/1991 | Herbst |
| 5,234,555 A | 8/1993 | Ibbott |
| 5,271,814 A | 12/1993 | Metzler |
| 5,302,273 A | 4/1994 | Kemmerer |
| 5,423,962 A | 6/1995 | Herbst |
| 5,458,758 A | 10/1995 | Suchacz |
| 5,531,865 A * | 7/1996 | Cole .................. 205/751 |
| 5,549,812 A | 8/1996 | Witt a.k.a. Witte |
| 5,611,907 A | 3/1997 | Herbst et al. |
| 6,139,710 A | 10/2000 | Powell |
| 6,179,977 B1 | 1/2001 | Herbst |
| 6,689,271 B2 | 2/2004 | Morkovsky .................. 205/757 |

* cited by examiner

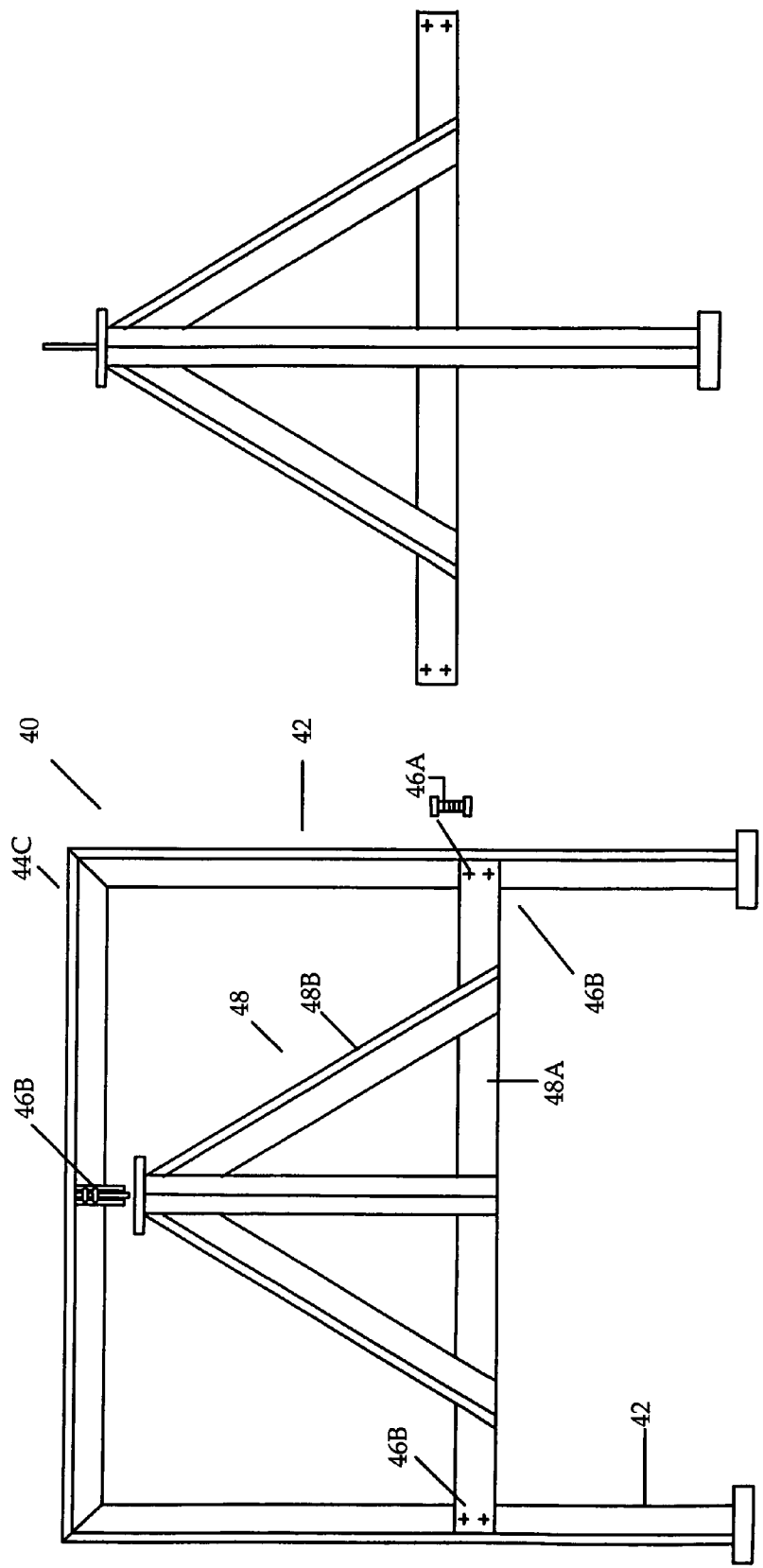

ELECTROCOAGULATION REACTOR

This application claims priority, is a continuation from, and incorporates herein by reference U.S. patent application No. 10/171,926, filed Jun. 14, 2002; which claims priority from U.S. patent application No. 60/318,730, filed Sep. 12, 2001; which is also herein incorporated by reference.

This application is related to U.S. patent application No. 08/976,695, filed Nov. 24, 1997, PCT/US98/24885, filed Nov. 23, 1998, U.S. patent application No. 09/554,975, filed Jul. 7, 2000, and U.S. patent application No. 09/961,524, filed Sep. 24, 2001, which are all herein incorporated by reference.

FIELD OF THE INVENTION

Electrocoagulation reactors, more specifically, a electrocoagulation reactor with the plates in parallel to the flow of the water.

BACKGROUND OF THE INVENTION

Wastewater, such as wastewater from factories or manufacturing plants, must be treated for contaminants before it is discharged into the environment. Water for use in industrial or other manufacturing process often requires treatment before use to alter its chemical or physical characteristics. Electrocoagulation is an electro chemical process that simultaneously removes heavy metals, suspended solids, organic and other contaminates from water using electricity instead of expensive chemical reagents. Electrocoagulation was first used to treat bilge water from ships. The Electrocoagulation process passes contaminated water between metal plates charged with direct current. While the term "wastewater" is often used herein, the term is to be understood to mean any water from which one may wish to remove a "contaminant" even though the contaminant may not necessarily be a material that would be harmful to ones health.

Additional background in the specifications regarding electrocoagulations may be found in U.S. Pat. No. 5,928,493, the specifications or drawings of which are incorporated herein by reference.

Applicant's provide, in the invention disclosed herein, an unpressurized electrocoagulation reactor, with plates in parallel to the flow of the water, which reactor has the capability of treating a higher flow of wastewater than has heretofore been available.

SUMMARY OF THE INVENTION

Applicants provide for these and other objectives in a parallel flow reactor comprised of one or more reactor cells. Each cell typically includes a tank containing a cartridge, the cartridge having a frame with a multiplicity of aligned plates therein. Water flows through the tank, typically up from the bottom of the cartridge-held plates over a top wall of the cartridge in "water fall" (cascading) fashion and out the tank for further processing or use. Applicant provides an electrocoagulation cell with an open top, one that is unpressurized and obtains, at least in part, the flow of water under the impetus of gravity.

Applicants provide for these and other objectives in an electrocoagulation reactor comprising, in a preferred embodiment, two electrocoagulation cells placed "in series." By "in series" applicant means that a molecule of wastewater will flow between two adjacent plate in the first cell of a reactor, out of the first cell of the reactor and between a second pair of plates in the second cell of the electrocoagulation reactor. Applicants provide, in a preferred embodiment of a two-cell electrocoagulation reactor, cells which are set in series. This is to be compared with the arrangement in a "series flow" reactor in which a single molecule of water would follow a serpentine path and pass between a multiplicity of plate pairs within a single cell.

Applicants provide for these and other objectives in a parallel flow, open top electrocoagulation reactor having one of more cells in series, wherein each cell typically contains a cartridge capable of being lifted out of the tank of the cell. In other words, applicants provide for a "cartridge" which is capable of receiving plates therein, and then dropped into, from the open top, the tank of a electrocoagulation cell, and, when the plates need replacement, the cartridge may be lifted out of the electrocoagulation tank so that the used up plates may be changed out with new plates at a point removed from the electrocoagulation tank. This and other advantages of applicant's cartridge will be apparent with reference to specifications and drawings contained herein.

Applicants' unique cartridge also provides for the ability to accept plates of differing dimensions so, for example, a single cartridge may either receive plates with a given height, or, if the user requires less treatment capacity, to receive plates of a shorter or greater height. Thus, a user may, instead of using a reactor with a different size tank, simply use the same tank and same cartridge, but use, if the conditions require, plates with less or greater surface area.

Applicants provide for efficient treatment of wastewater in a parallel flow, open top, cartridge-receiving electrocoagulation cell in which there are a multiplicity of plates, at least some of the plates being alternately charged positive and negative, sometimes with an "intermediate" or uncharged plate (or plates) between adjacent positive and negative plates.

Applicants provide for these and other advantages and objects in an electrocoagulation reactor consisting of electrocoagulation cells in which, beneath the plate bearing cartridges and in fluid communication therewith is a solids sump with a drain attached thereto for removing from a tank of the electrocoagulation cell, waste sediment that has resulted from the electrocoagulation of waste particles and for removal of the collected sediment from a drain therein.

Applicants provide for these and other advantages and objectives, in an electrocoagulation reactor system comprising a unique stand for cooperatively engaging the tank and cartridge of the electrocoagulation cell to provide direct weight-bearing support of the plates in the cartridge of the electrocoagulation cell.

Applicants additionally provide a plate for use with any type of electrocoagulation reactor system, which plate contains cutouts in the walls there through, the cutouts for more effective treatment of wastewater passing adjacent the plate.

Applicants additionally provide, for use with any reactor, a recirculation pump and recirculation loop. The recirculation pump and loop takes some, but not all, of the water flowing out of a reactor and recirculates it through the reactor by, typically, routing it upstream of the intake of the reactor. This allows the user to maintain a greater flow of fluid through the reactor than the net flow of water treated.

Applicants also provide for a novel dissolved air floatation cell for the treatment of wastewater using an electrocoagulation reactor.

BRIEF DESCRIPTION OF THE DRAWINGS

FIGS. 7A-E are various view of a stand for use with Applicants' electrocoagulation reactor.

DETAILED DESCRIPTION OF THE PREFERRED EMBODIMENT

Figure 1:
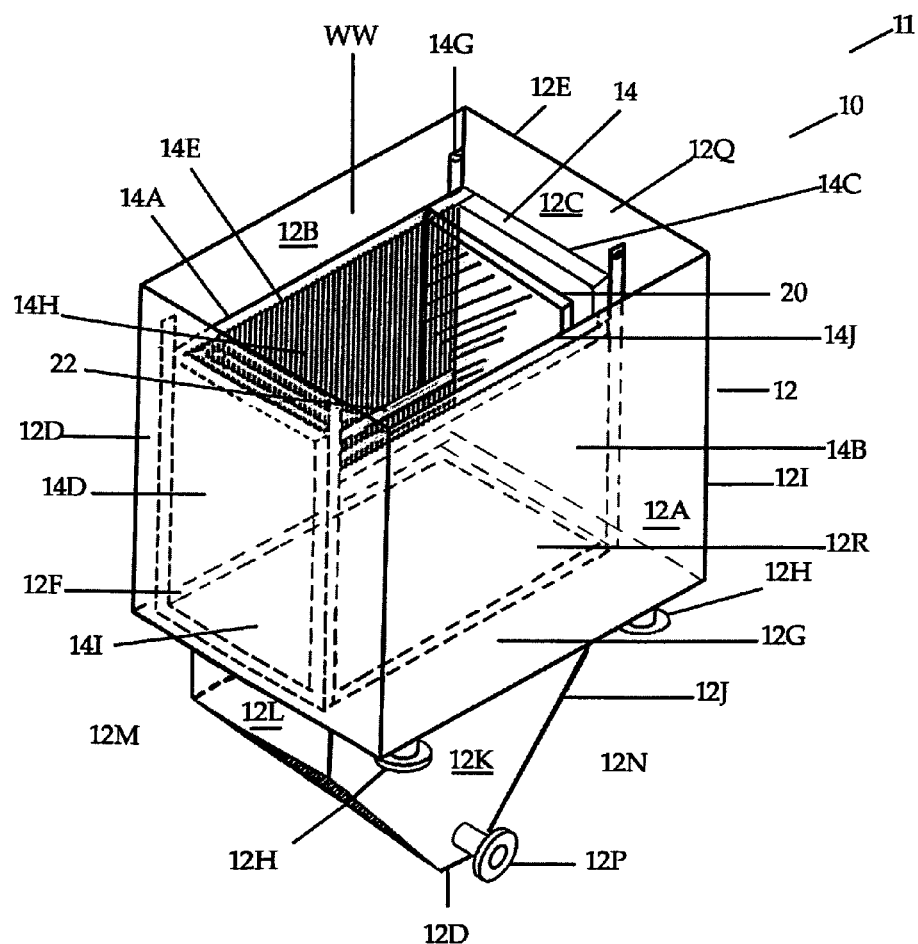
FIG. 1 illustrates an isometric view of a single parallel flow cell.
Figure 1A:
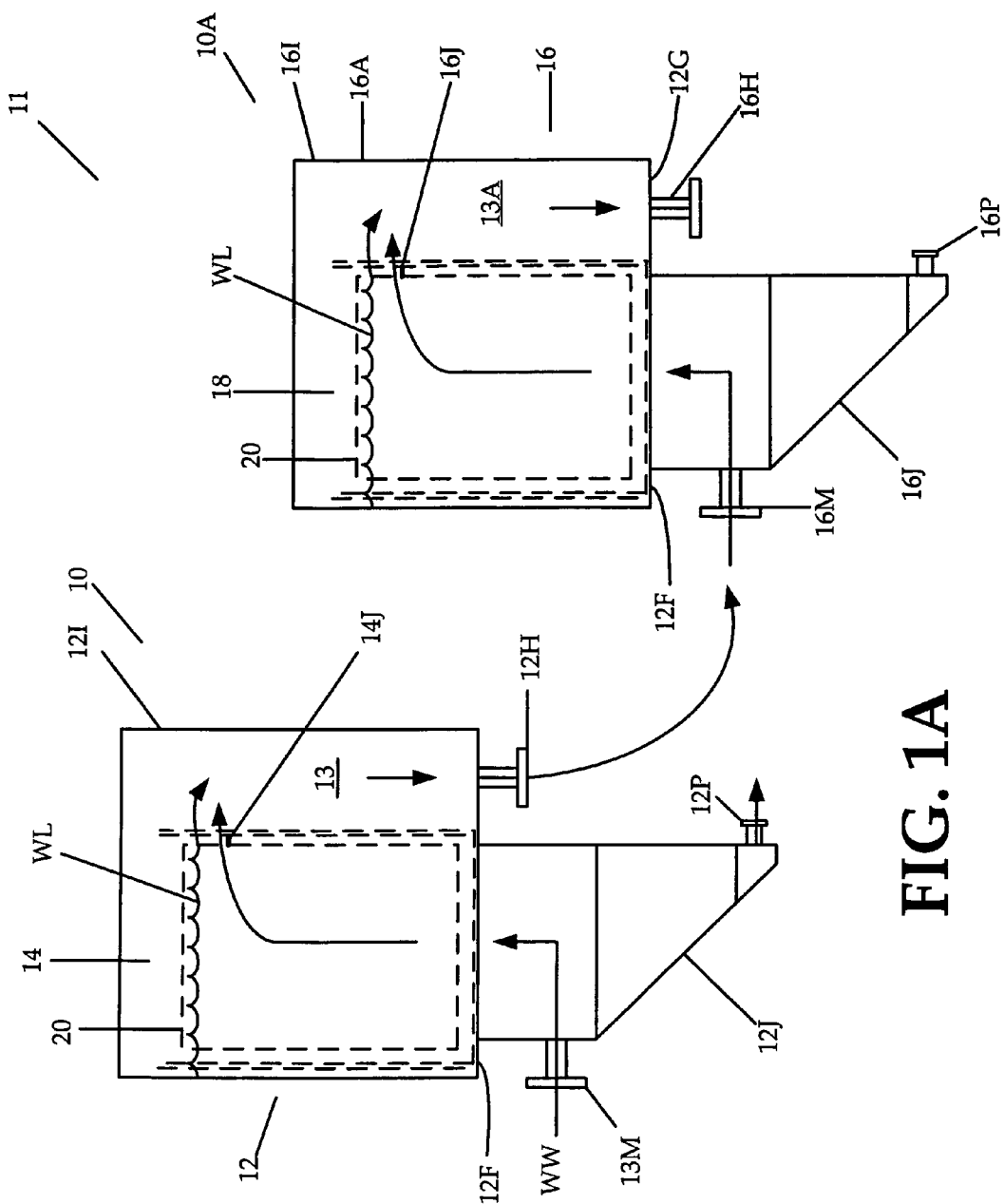
FIG. 1A is a side elevational view of a pair of parallel flow reactor cells in series.

Turning to FIG. 1 it is seen that applicant provides an electrocoagulation reactor 11 which may be comprised of a single electrocoagulation cell 10 or two or more electrocoagulation cells 10 and 10A placed in series, see FIG. 1A.

Attention will be first directed to FIG. 1 to explain the structure and function of an electrocoagulation cell 10. Once this is understood, it will be seen that the structure and function of electrocoagulation cell 10 is nearly identical to second cell 10A (See FIG. 1A). Turning back to FIG. 1, it is seen that first electrocoagulation cell 10 is comprised of a typically open topped cell tank 12 and a first cartridge 14 resting inside the tank 12 in wastewater WW. Tank 12 is typically watertight and may be rectangular, or any other shape and typically includes an open top 12Q. In any case, cell tank 12 is typically unpressurized and may be made of fiberglass, steel or plastic, or in fact any other suitable material which would provide watertight sealing and would not react with the wastewater. Cell tank 12 is seen to have, in the preferred embodiment illustrated in FIG. 1, four sidewalls, 12A, 12B, 12C and 12D set perpendicular to one another so as to provide the rectangular structure illustrated as cartridge receiving portion 12I of the tank 12. Depending below cartridge receiving portion 12I and integral therewith and in fluid communication with cartridge receiving portion receiving 12I is sump portion 12J of tank 12. It is seen with reference to FIG. 1 that cartridge receiving portion 12I has an open bottom 12R. It is also seen that cartridge receiving portion 12I of cell tank 12 includes a rectangular cartridge support ledge 12F and a cartridge support and drain ledge 12G. The four ledges directed inboard along the perimeter of the sidewalls act as a base to hold the cartridge 14 along the lower edges, so water may enter the cartridge from below. The function of the ledges is to support the lower perimeter of the first cartridge 14 as it rests in cartridge receiving portion 12I. Additional features of cell tank 12 include an upper perimeter 12E defined by the upper edges of sidewalls 12A, 12B, 12C and 12D. Depending below cartridge support and drain ledge 12G are one or more drains 12H which will accept wastewater from a transfer chamber 13 (see FIG. 1A). The transfer chamber 13 is the space between a front wall 14B of the cartridge 14 and sidewall 12A of the cell tank 12.

Turning now to sump portion 12J it is seen that this portion of cell tank 12 is located below open bottom 12R of cartridge receiving portion 12I so as to collect waste solids and suspended materials settling out from between plates 20 of first cartridge 14 (see FIG. 1A), at the bottom thereof for removal through a sump drain 12P. Sump portion 12J typically includes one or more canted or slopped sidewalls here showing four sidewalls designated 12K, 12L, 12M and 12N so as to funnel, under the impetus of gravity, settling solids to sump drain 12P for removal therefrom.

It is seen that first cartridge 14 is typically not mechanically fastened to cartridge receiving portion 12I or any other portion of cell tank 12, but merely rests along a portion of the bottom of cartridge receiving portion 12I here resting along the edges below rear wall 14A and front wall 14D on cartridge support ledge 12F and cartridge support and drain ledge 12G, respectively and on ledges below the sidewalls of the cartridge. First cartridge 14 is typically rectangular shaped and dimensioned for the receipt within cartridge receiving portion 12I of cell tank 12 so as to allow water coming in through inlet 13M to circulate up through a pair of adjacent plates 20 and to cascade over the weir 14J (or top lip) of front wall 14B into the transfer chamber 13 (See FIG. 1A). In other words, a close examination of first cartridge 14D as set forth in FIG. 1 will reveal that rear wall 14A and the two end walls 14C and D are the same height but that front wall 14B comprises an upper perimeter or lip defining a weir 14J that is lower.

Moreover, both rear wall of 14A and front wall 14B have vertical slots 14E on their inner faces for the acceptance of plates 20 in "slotting fashion." Plates 20 are held along a pair of removed vertical edges and suspended between the front wall 14B and the rear wall 14A with the entire cartridge having an open top 14H and an open bottom 14I for water to pass up through the plates 20 as illustrated in FIG. 1A. It is seen that first cartridge 14 also includes handling straps 14G which may contain a hole at the removed ends thereof. The straps may extend down the vertical sides of the cartridge 14 and beneath the walls to support them from below, and above the walls of the cartridge 14 to engage one or more of hooks (not shown) to provide a mechanical assist to lift the entire cartridge 14, with the plates 20 therein, out of the open top 14H of the tank 12 for replacement of the used up plates of the cartridge 14, "offline." Following plate 20 replacement, the cartridge 14 is reinserted into the tank.

The function of first cartridge 14 is to provide structure to define and maintain a passageway for water entering through one or more inlet 3 13M such that the water will pass through a space between a pair of a multiplicity of pairs of plates 20 maintained between the front and rear walls of the cartridge 14, in such a manner that the water spills over weir 14J into transfer chamber 13 for leaving cell tank 12 through drain 12H. As the wastewater proceeds between the pair of oppositely charged plates 20 and any intermediate plates therebetween it will be subject to an electric field which will promote electrocoagulation processes known in the prior art.

FIG. 1A illustrates that a preferred alternate embodiment of applicants' present invention uses a second electrocoagulation cell 10A placed in series with the first electrocoagulation cell 10, the combination being referred to as electrocoagulation reactor 11. That is, it is seen that FIG. 1A illustrates raw water WW (untreated water) entering through inlet 13M and passing between the plates of first cartridge 14 and then passing over weir 14J and out drain 12H. It is seen that the water then passes into inlet 16M of second tank 16. It is seen that second cell tank 16 includes a second cartridge 18 which is substantially identical to first cartridge 14 in all material components thereof and its function. Water overflowing second weir 16J into transfer chamber 13A will exit the electrocoagulation reactor 11 through drain 16H (assuming this is only a two-cell reactor). It is found that providing two cells in series, the second cell either being lower or having a weir lower than the first cell 10 allows water to flow through the cells under the impetus of gravity (no pump necessary). Further, the use of a pair or more of series engaged cells has proven to be effective in removing contaminants from the water. While each of the two cells illustrated in FIG. 1A includes its own separate tank 12 and 16, respectively, it is possible to set up a single large tank for two individual cells, each cell being defined by its own cartridge and, further defined, by the passageway of a single water molecule through a single pair of plates in the first cartridge, and then passing through a single pair of adjacent plates in the second cartridge and then out the cell or tank. Applicants may provide a reactor containing two or more cartridges set up in series, each cartridge with its own tank as illustrated in FIG. 1A.

Figure 1B:
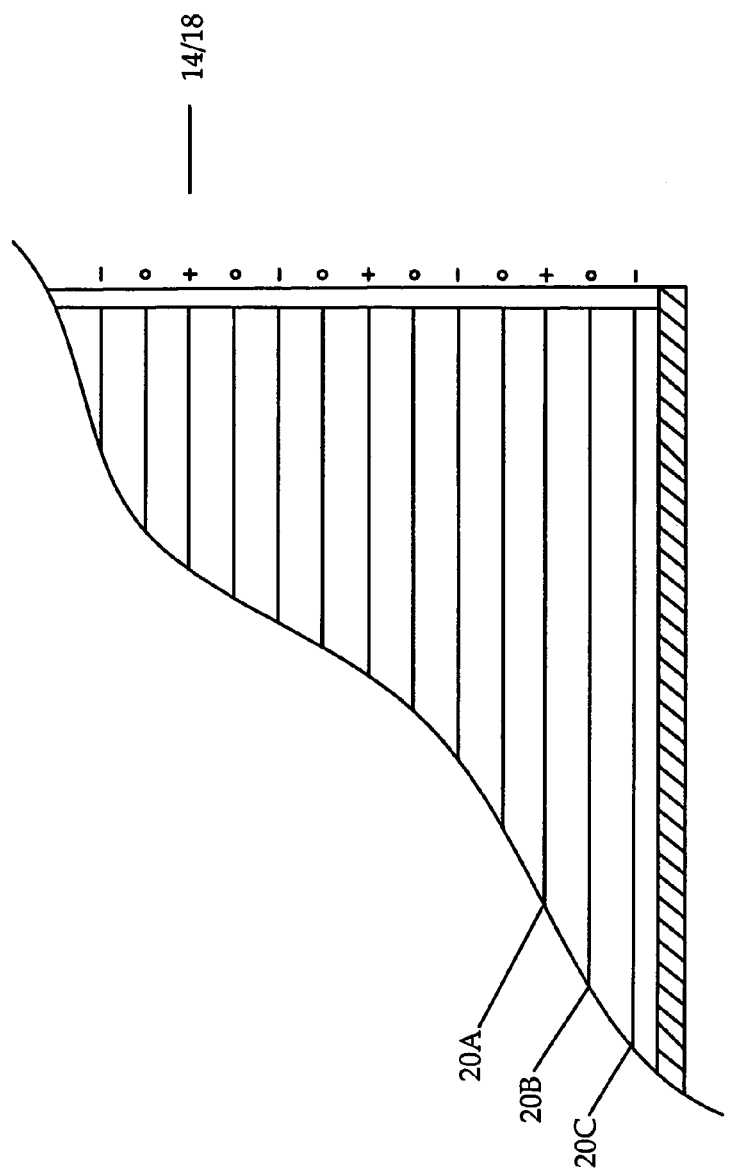
FIG. 1B is a partial elevational view of a multiplicity of parallel plates for use in Applicants' novel electrocoagulation reactor.
Figure 1D:
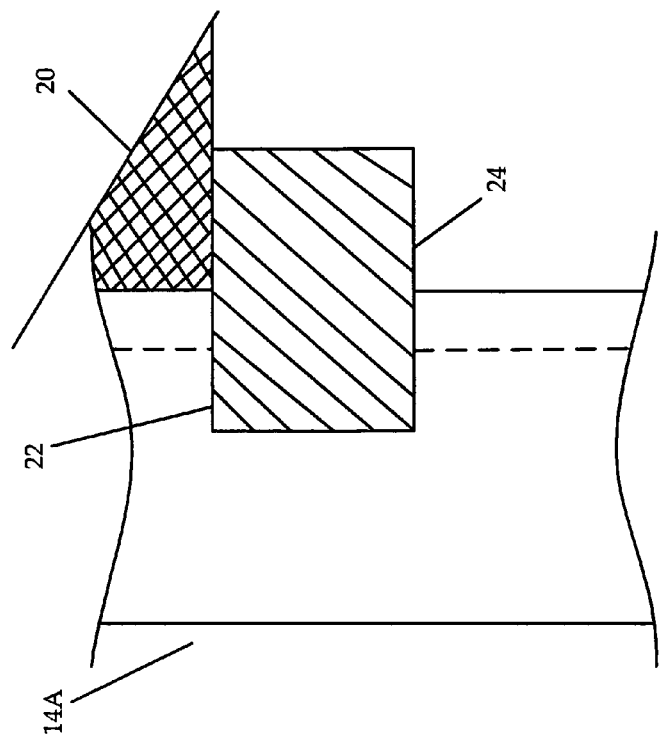
FIGS. 1C and 1D are partial side elevational views illustrating the manner in which Applicants' cartridge may be modified to contain plates of different heights.
Figure 1C:
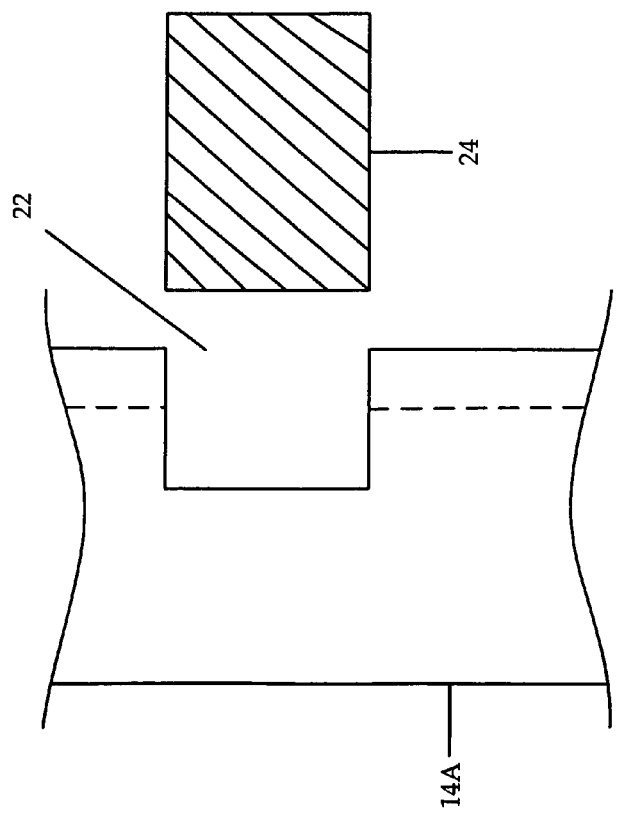

FIG. 1B illustrates a top elevational view of a portion of the sidewall and end wall of a cartridge and the manner in which positively and negatively charged plates may carry an intermediate or uncharged plate therebetween to assist in the effectiveness of the electrocoagulation process. That is, FIG. 1B illustrates a multiplicity of parallel plates including a positively charged plate 20A, intermediate (neutral or uncharged) ungrounded plate 20B and a negatively charged plate 20C. These plates are attached to a rectifier and the voltage therebetween may be adjustably set, typically to between zero and up to 50 volts DC.

In a preferred alternate embodiment there may be more than one immediate or neutral plate between adjacent positively or negatively charged plates or, there may be no neutral plates at all between adjacent negatively and positively charged plates. However, it is seen that whatever configurations the sets may take they are disposed parallel to one another as set forth in FIG. 1B.

In first preferred embodiment in cartridge 14/18, the plates 20, as seen in FIG. 1A will extend from at or near the top of the cartridge to at or near the bottom of the cartridge. That is, the bottom edge of the multiplicity of plates may be adjacent to the top and bottom of the cartridge. However, applicants provide in a novel cartridge means to accept shorter plates, that is, plates that do not extend fully down to the bottom of the cartridge, in an effort to control the effectiveness and handling of the cartridge of the cell when handling a waste water load that is less than the maximum capacity of the reactor.

As a bit of background, reactors are typically rated in their ability to handle wastewater by the maximum amount of wastewater flow that can be treated by a given reactor. For example, a reactor may be designed to treat wastewater with a given conductivity/resistivity range at a flow of 500 gallons per minute. This rating for that given reactor is for a reactor with full plates as illustrated in 1A. However, the situation may arise where, for example, water with reduced flow rate is being treated and therefore the same applied voltage, say, for example, 48 volts may be used but the user may "size" the cartridge with smaller plates for easier handling and increased efficiency. It is found to be advantageous to use the same cartridge and provide a means for inserting shorter plates so as to efficiently handle wastewater with a lower flow rate than the maximum capability of the reactor cell. For example, a user may wish to purchase a cell of 500 gallons per minute maximum capacity even though the current demand of that user is only, say, 200 gallons per minute. It may be more economical to purchase a larger unit and use shorter plates and, when the requirements of the user increase to use the same cartridge and purchase longer plates. Applicants have provided for a mechanism in their unique cartridge system which will allow for the acceptance of shorter plates therein.

To "size" a reactor, one could build eight to ten different size tanks and cartridges to cover the different flow rate demands from, for example, 100 gallons per minute to 1500 gallons per minute. However, by using Applicant's design one can cover the entire range with only two different size tanks and cartridge by creating a flexible cartridge system allowing use of different size plates. In this way, a single cartridge design can be used to accommodate flow rate demands from 100 gallons per minute to 500 gallons per minute and another single cartridge design can accommodate flow rate demands of 500 gallons per minute to 1500 gallons per minute. This system is illustrated in FIGS. 1, 1C, 1D and 2. It is noted that both the front and the rear wall have a horizontally cut notch at a pre-described location above the bottom edge of the front and the rear wall. Notch 22 is dimensioned for snug receipt of a stop member (24), typically a rectangular, elongated member sized to wedge snugly into notch 22. With notch 22 along the inside surface of both the front wall and the rear wall the same distance above the bottom edge of each of those walls and with the stop members (24) firmly inserted in the notches, the cartridge can accept a shorter plate by receiving the lower edge of the plates (20) against the upper surface of the stop member 24 (See FIG. 1D).

Moreover, with water being treated at less than the maximum rated capacity, it is beneficial to raise the height of weir 14J/16J to decrease the amount of "freeboard" or the amount of exposed plate above water level WL (exposed plate is "wasted" when the rest of the plate is being consumed). A method for increasing the height of weir 14J/15J is illustrated in FIG. 1E. It is seen with respect to FIG. 1E a riser 26 may be provided which is simply a rectangular, elongated member shaped to fit on top of weir 14J/16J by means, for example, of a dowel 26A/hole 26B combination as illustrated in FIG. 1E. That is, a series of vertically aligned holes 26B may be provided projecting downward from the top surface of weir 14J/16J and a pair of identically spaced and dimensioned holes provided in riser 26 projecting from the underside of riser 26 up into the riser 26. With this arrangement, holes in the riser and weir dowels 26A may be used to snugly seat riser 26 to weir 14J/16J to effectively raise the level the water which will reach before it pours over the weir 14J/16J and, likewise, would decrease the amount of "freeboard" on the steel plates. The reason for decreasing the amount of freeboard is that it represents waste of the plate. Ideally, there should be almost no freeboard and the entire plate should be consumed in the electrocoagulation process.

Applicant's concept of sizing the plates for a flow rate of less than the maximum capacity of the electrocoagulation cell at a given voltage for a given set of treatment parameters for water gives the user the possibility of using a single "universal" cartridge—that is, a cartridge whose plates or other variables can be sized so that it will effectively run water with requirements substantially less than the maximum capability of the unit, through the use of smaller plates. Smaller plates are, again, advantageous as they make handling of the cartridge which, loaded with plates, may weigh several thousand pounds, much easier. Applicants' provide for a universal cartridge with the ability to easily alter the cartridge to accept the plates with differing dimensions, while also being able to alter the weir 14J/16J height of the cartridge 14 to adapt to the smaller plates. Some of the electrocoagulation cells can use up to 7,000 pounds of steel plates in a single cartridge. Therefore, the decreased lift-out and handling requirement may be readily appreciated.

One could lift out Applicants' cartridge, which consists of a frame around the plates, and then, with the cartridge removed from the tank, change out the plates. In other words, plates don't have to be changed out directly from the tank. Indeed, one can withdraw one cartridge and immediately insert a second cartridge, full of plates and, at their leisure, remove the wasted steel plates from the first cartridge. In other words, the lift out cartridge provides that the plates can be removed "in mass" and "replaced in mass," a system where the electrocoagulation reactor does not have to be shut down or be taken off-line while the plates are changed out.

Figure 1F:
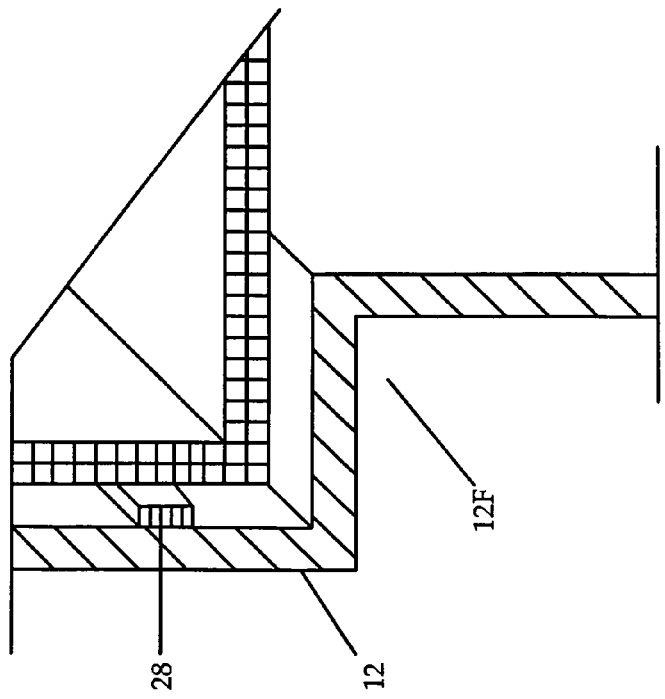
FIG. 1F illustrates a device for maintaining separation between the wall of the tank and the wall of the cartridge, in partial view, cutaway isometric.
Figure 1E:
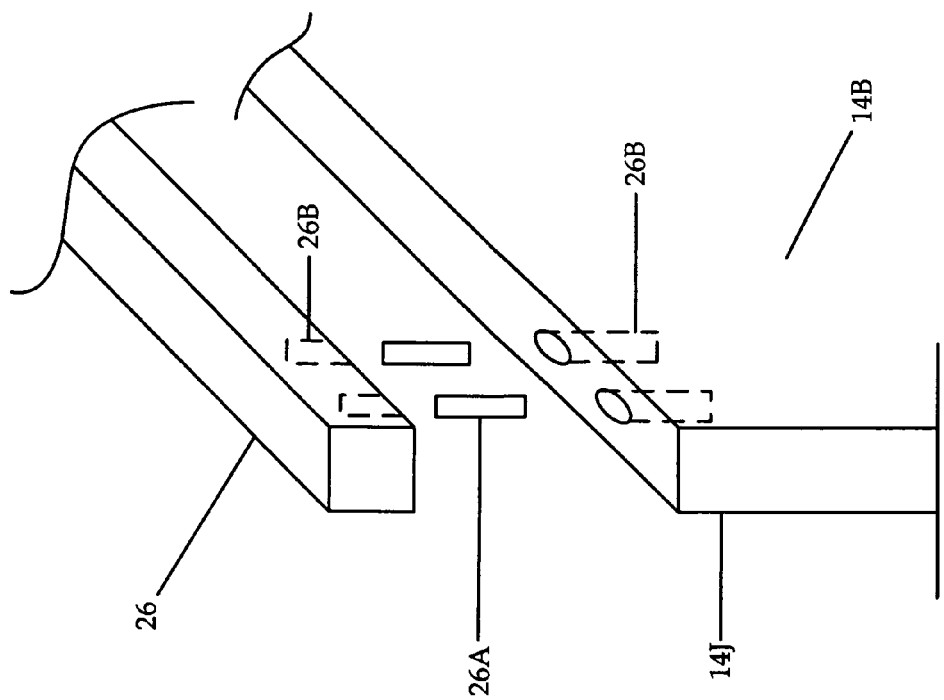
FIG. 1E is a partial isometric view of a device and method for raising the height of the weir of Applicants' electrocoagulation cell by attaching a riser thereto.
Figure 2:
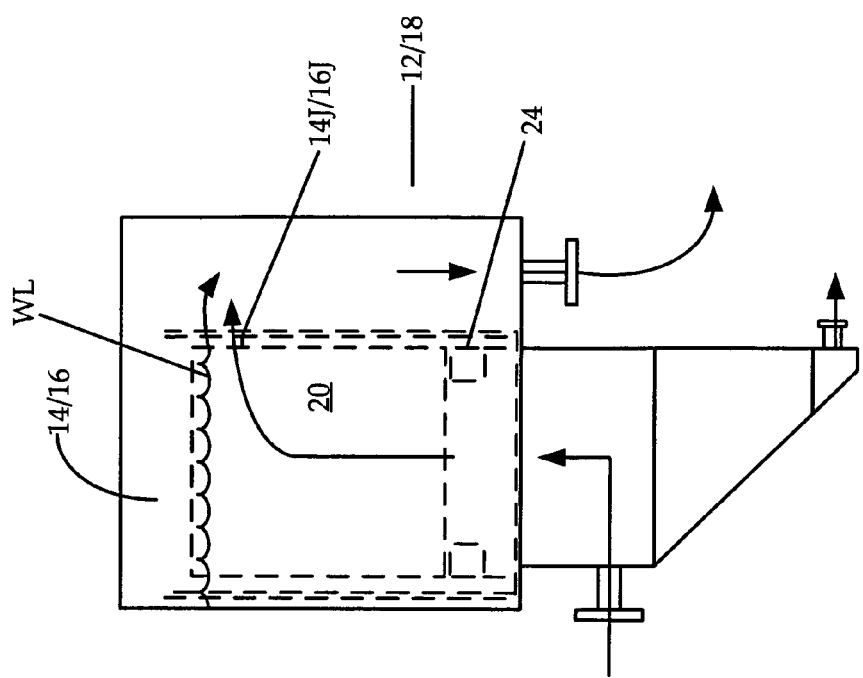
FIG. 2 illustrates a side elevational view of a parallel flow electrocoagulation reactor.
Figure 3:
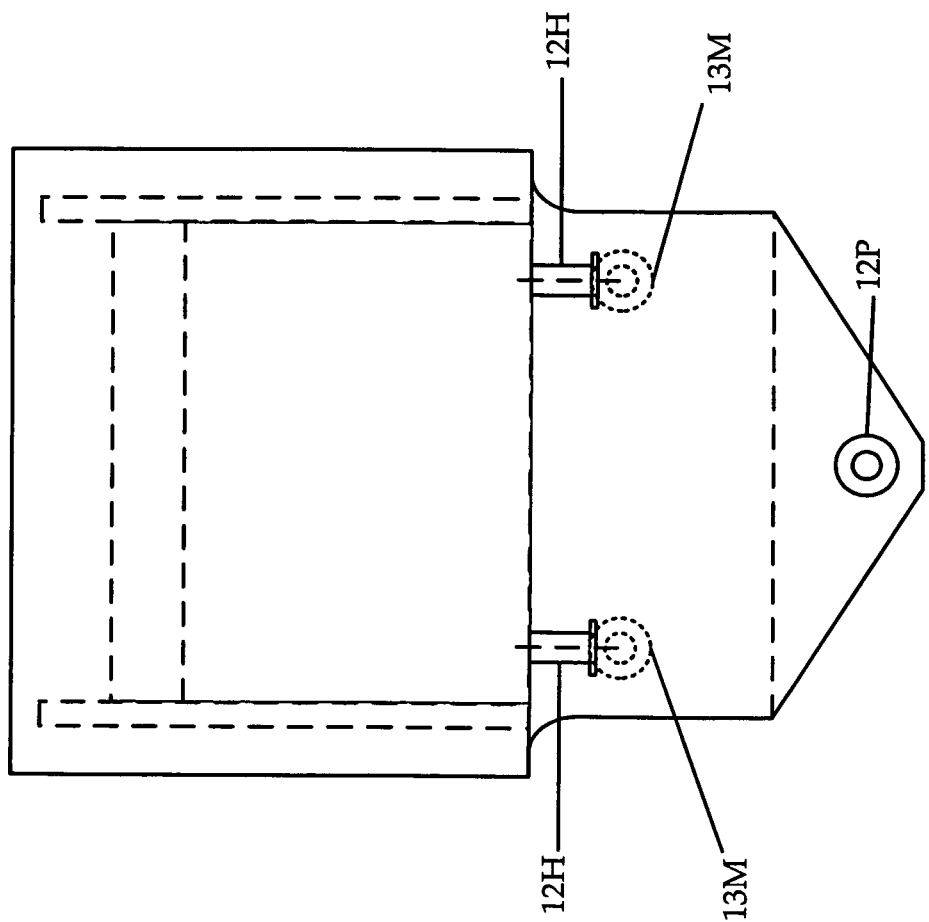
FIG. 3 illustrates a front view of the electrocoagulation cell illustrating a pair of drains 12H to remove liquids therefrom.

Applicants provide yet another advantage in providing in FIG. 1F, structure defining bumpers 28. This will allow the cartridge 14, as it is lifted in or out of the tank 12 to be protected from banging directly into the inside surface of the sidewalls of the tank or the bottom of the tank. Bumpers 28 may be made out of hard rubber or any other suitable, durable, non-reactive material.

Figure 4:
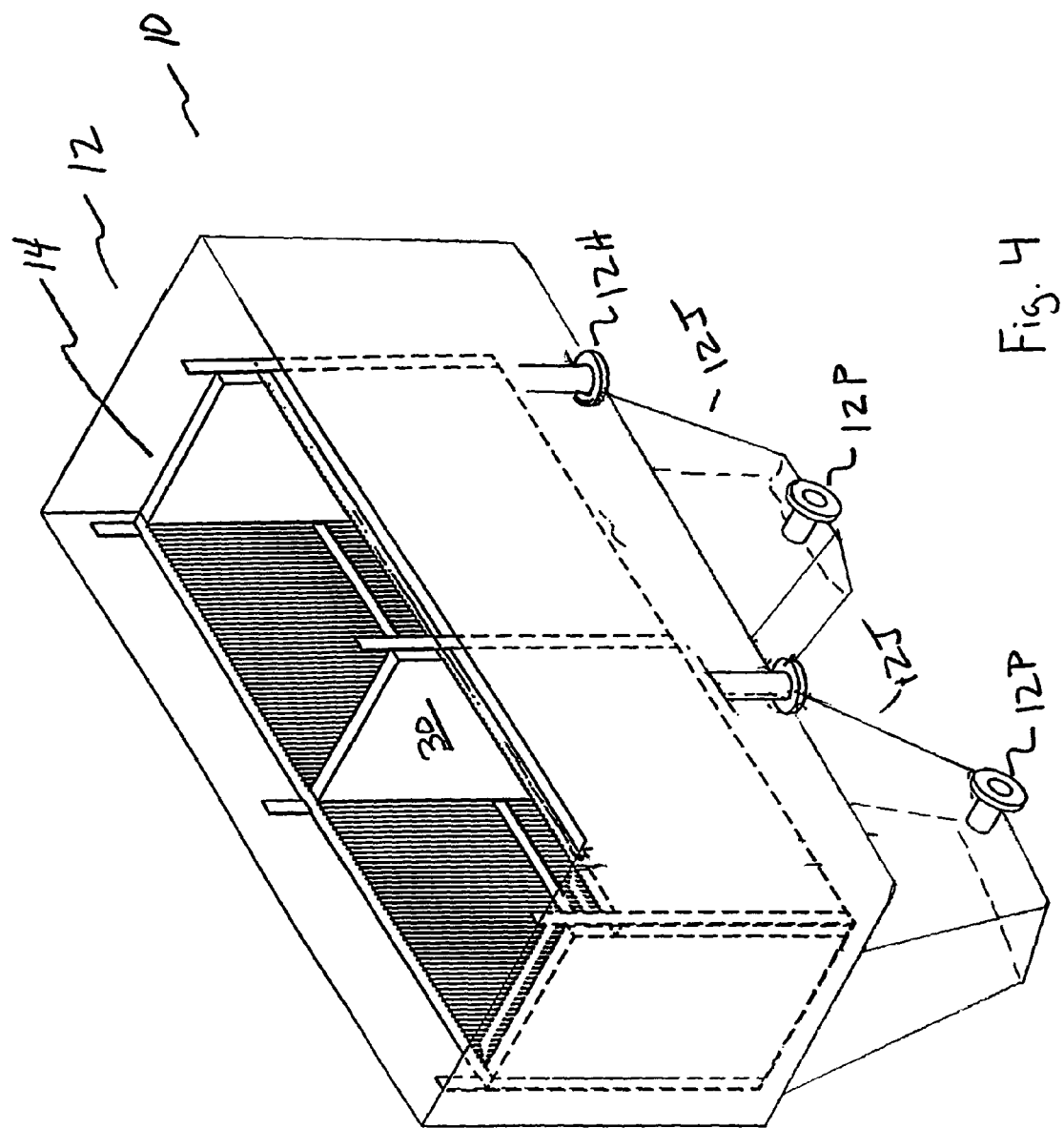
FIG. 4 illustrates an isometric view of two parallel reactor cells in a single tank.
Figure 5:
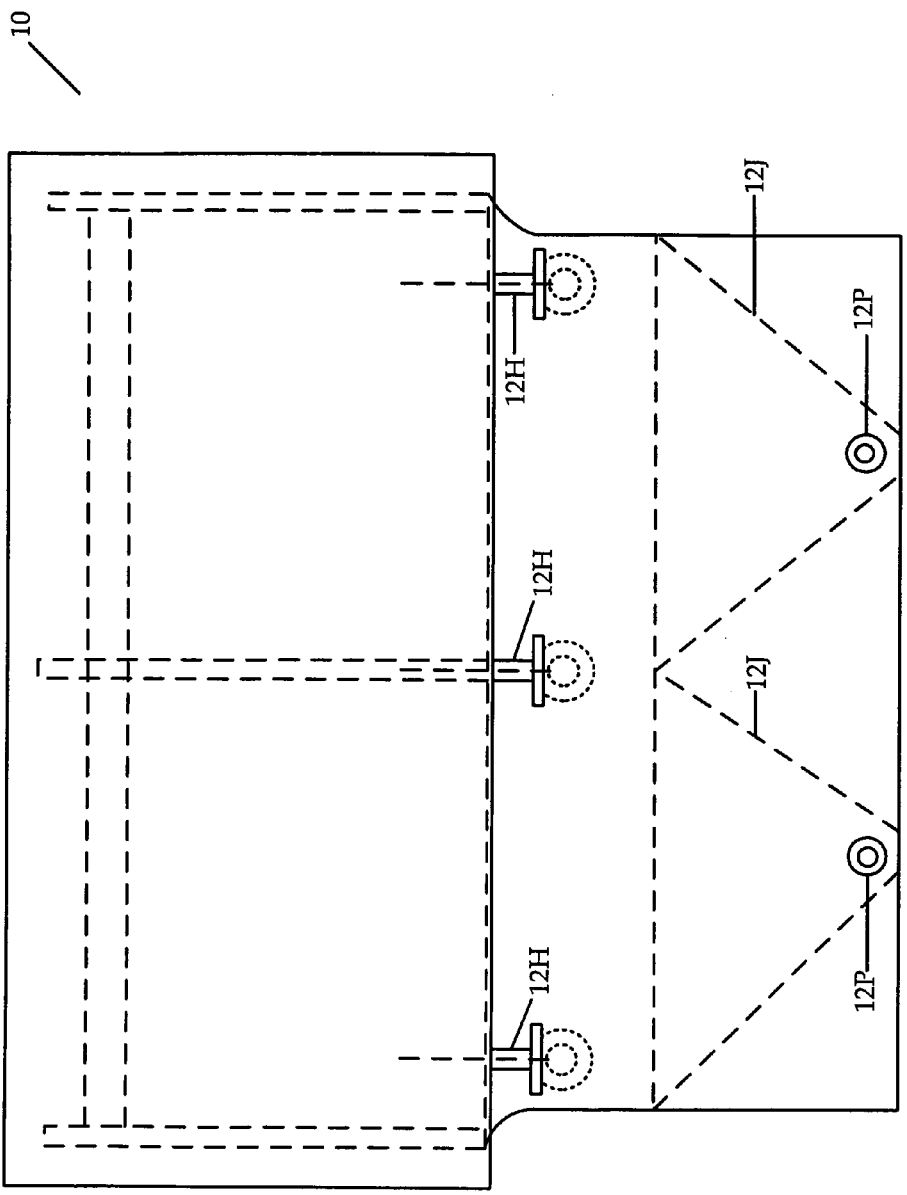
FIG. 5 is a front elevational view of a single reactor tank having a pair of cartridges therein and a multiplicity of circulation drains and inlets.
Figure 6:
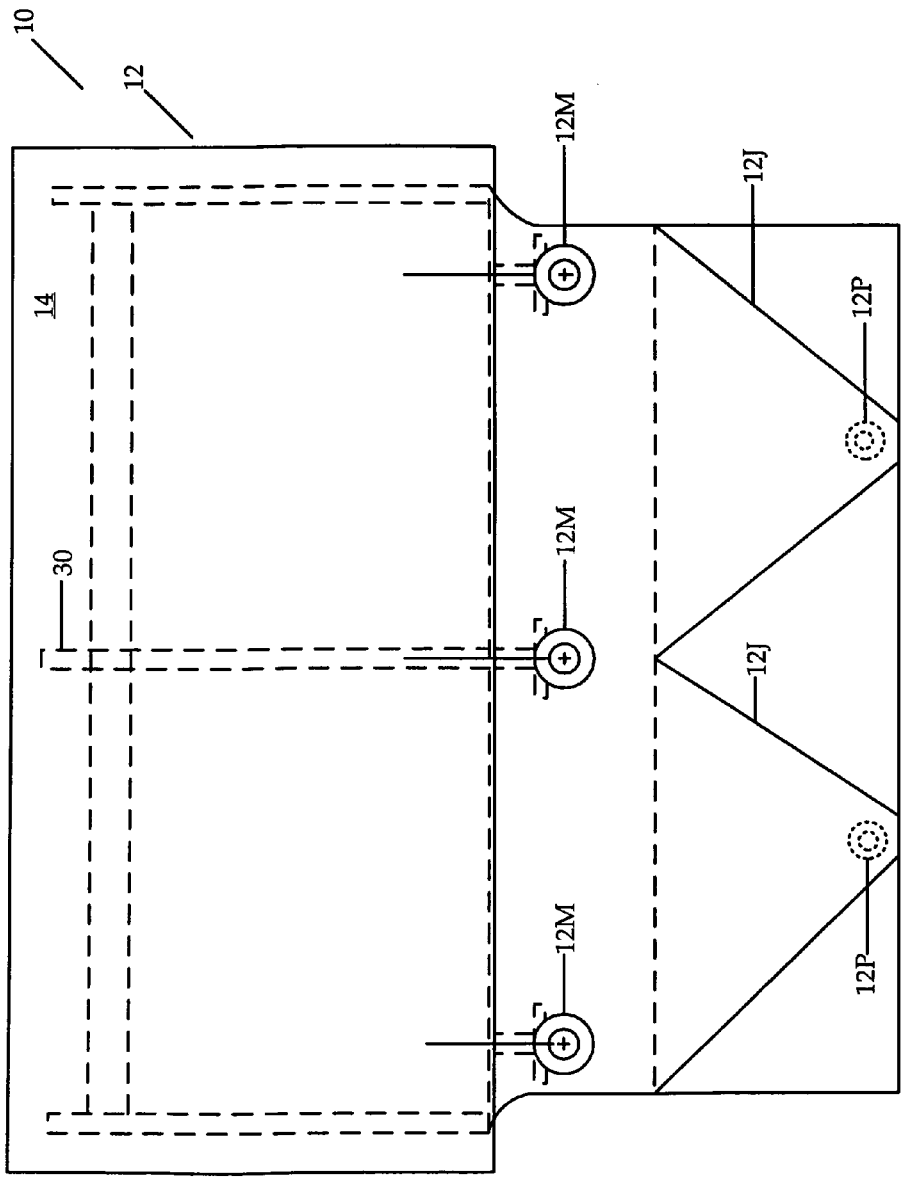
FIG. 6 is a rear view of the illustration set forth in FIG. 5 above.

FIGS. 4, 5, and 6 all illustrate an alternate preferred embodiment of an electrocoagulation cell 10 which doubles the capacity of the aforementioned electrocoagulation cells by providing tank 12 with a larger volume, typically about twice to four times the volume of the cell set forth in the earlier embodiments. The size of the cartridge 14 is also increased, that is, to handle many more plates. An intermediate wall 30 is provided in the cartridge for structural support. It is also seen that there may be a pair of sump portions 12J each one with a drain sump 12P. The drain sumps are provided to remove any sediment settling in the sumps. There also may be two or more drains 12H.

Applicants' open top, unpressurized parallel flow reactor may have a number of plate arrangements including: plus minus plus minus: plus n minus n plus n minus, etc. The recirculation loop may recirculate through one or more cells of the reactor. Typically, water will flow through each individual solid reactor from bottom to top, to assist in the escape of gases. Individual plates of each cell may be tabular in nature and made from iron, steel, aluminum or other material. They may include "cutouts" in various shapes (see FIG. 8B) to help generate a non-uniform and more varied e-field between the plates. Extra difficult waters may be treated a number of passes through the cells through the use of a recirculation pump (see below). There may be a number of water inlets across the bottom of the housing of the parallel flow reactor to help generate even flow across the plates.

Figure 7B:
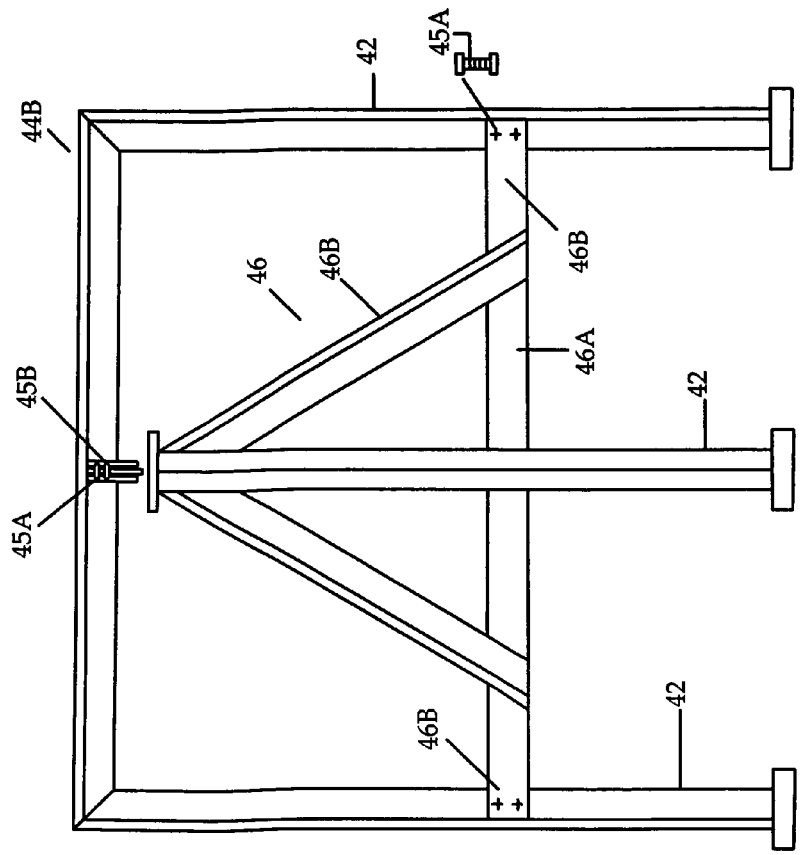
Figure 7A:
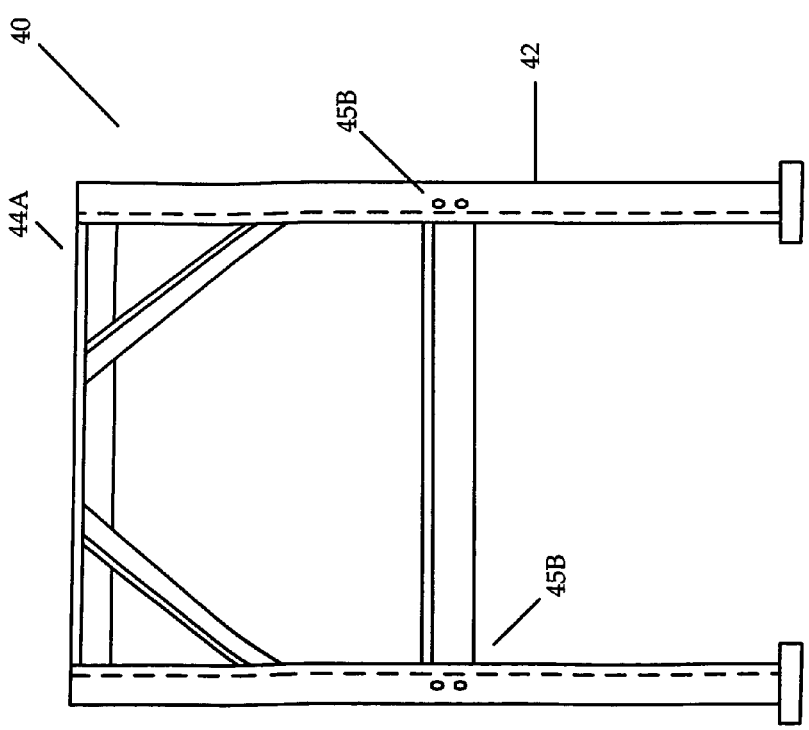
Figure 7E:
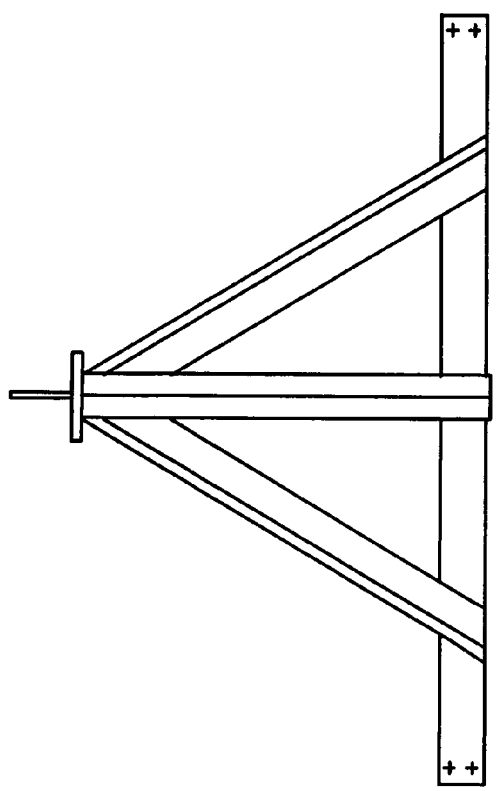

FIGS. 7A through 7E illustrate components of Applicant's cell stand 40. FIG. 7A represents a left and right side assembly for the rectangular stand. FIG. 7B is a rear assembly for the stand. FIG. 7C is a front assembly for the stand. FIG. 7D is a view of a cross brace for use with the rear assembly of the stand. FIG. 7E is another cross brace for use with the front assembly of the stand.

When bolted together the front assembly, rear assembly and two side assemblies form a rectangle which will vertically support the cell tank 12 at a point immediately below the lower perimeter of the cartridge 14 that is placed in the tank so as to avoid any sheer or flex loading on the bottom walls of the tank. That is, when bolted together the cell stand 40 will have upper perimeter walls that are dimensioned identical to at least a portion of the lower perimeter of the cartridge.

It is seen that electrocoagulation cell stand 40 has a number of vertical support legs 42 for providing a vertical support to tank support perimeter members 44A, 44B and 44C. The tank perimeter support member 44A provides support to the left and right side of the tank, 44B provides support to the tank directly beneath the rear wall of the cartridge and vertical support perimeter 44C provides vertical support to the tank directly below the front wall of the cartridge. Fasteners 45A are used to fasten the stand together by engaging bolt holes 45B. Note that both the rear assembly of the stand and the front assembly of the stand include cross braces 46 and 48, with cross brace 46 on the rear assembly of the stand including a vertical support leg 42 for reaching all the way to the floor. (See FIG. 7B) Compare this to FIG. 7C which illustrates the front assembly of the stand. Here there is no third leg. This is because the tank illustrated in FIG. 1 has a solid drain 12P which projects horizontally out from the side wall. Further, note with reference to FIG. 1 that placement of a stand beneath the tank so as to brace the stand directly beneath the lower perimeter of the cartridge requires that the tank support members 44A, 44B and 44C must be attached so that vertical support member 44C will lay between the two drains 12H and sump sidewall 12K. The rear tank support perimeter 44C will lay between the two inlet blanks 13M and the sidewall of sump portion 12J. However, the third vertical support leg 42 shown in FIG. 7B (the one between the two outer support legs) is used since there is no drain on the rear portion of the tank. The two sidewall portions of tank support perimeter 44A will lay beneath the sidewalls of the lower perimeter of the cartridge and snugged against the sidewalls defining sump portion 12J. Applicant's unique cell stand 40 has the unique ability to bolt together around the upper perimeter of sump portion 12J of cell tank 12 in an manner that by, unbolting the six (6) bolts and bolt holes, the six (6) fasteners illustrated in FIGS. 7B and 7C one can take apart the stand around the sump portion so as to provide clearance for the solid drain 12P.

Figure 8B:
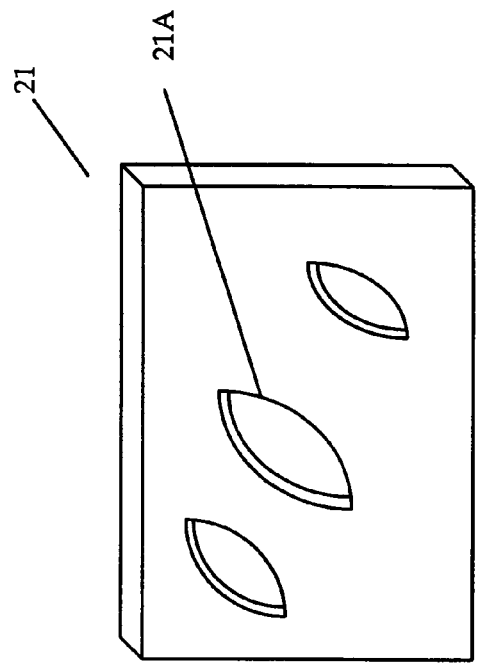
FIGS. 8A and 8B are isometric views of different embodiments of plates for use in Applicants' electrocoagulation reactor.
Figure 8A:
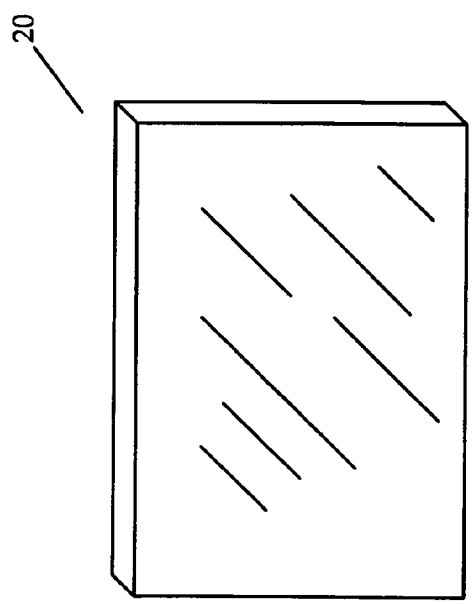

FIGS. 8A and 8B illustrate the first plate 20, which is seen to be tabular and solid. Applicants have found that efficiency may be increased by providing an alternate preferred embodiment here plate 21 which includes cutouts 21A in the walls thereof. It is believed that cutouts generate disturbances in the uniformity of the electromagnetic fields between the plates and therefore assist in the efficiency of the electrocoagulation units. However, they typically are also more expensive than providing plates without cutouts as set forth in FIG. 8A.

Typically, a reactor is rated at a given flow rate and works most efficiently at that flow rate. For example, a 350 GPM parallel flow electrocoagulation reactor is preferably not run at less than 50 gallons per minute. Applicants provide, in FIGS. 9 and 10, a means for recirculating a portion of the water exiting an electrocoagulation reactor and thereby achieving a net flow downstream from the reactor of treated water of a flow rate less than that of the water flowing through the reactor. For example, a flow rate of 200 gallons per minute may be maintained through a reactor with a recirculation loop drawing off part of the water exiting from the electrocoagulation reactor and reintroducing it upstream of the inlet of the electrocoagulation reactor. A net flow of, for example, 100 gallons per minute of treated water may result while maintaining a given flow rate at 200 gallons per minute through the electrocoagulation reactor. In other words, an overall flow rate of 200 gallons per minute (for example) may be maintained through the electrocoagulation reactor portion of the system by using a recirculation pump and recirculation loop while treating a net amount of water equal to, for example, with reference to FIG. 9, 100 gallons per minute. The use of a recirculation loop may increase the residence time for a particular waste that needs extra treatment. The alternative would be to have two reactors, two rectifiers etc., which would be costly.

A recirculation loop may be used with any of Applicant's embodiments disclosed herein, in fact with any other electrocoagulation reactor or system. It provides a fairly simple and inexpensive means to maintain a given flow rate through a reactor while increasing the residence time of the water in the reactor (compared to a single pass) and, for decreasing the net flow of water treated but maintaining a higher flow rate through the reactor. For example, assume upstream pump (100) is pumping 100 gallons a minute from a water source (WS). Reactor (102) may be a 350 gallon per minute reactor. At this flow rating, there is sufficient flow through the reactor to properly scrub the plates and efficiently treat the water. One can use a recirculation pump (104) providing flow at the rate of 250 gallons per minute to provide a flow rate through a reactor of 350 gallons per minute. Yet the net treatment rate is 100 gallons per minute of waste water flow downstream from a recirculation junction (106). In fact, Applicant's may increase the flow rate through a reactor providing a flow rate greater than the rating for the reactor, which flow rate may provide additional water velocity to scrub the plates. For example, a flow rate of 400 gallons per minute may be provided through the reactor while the net waste water treatment may be 100 gpm or less.

Figure 9:
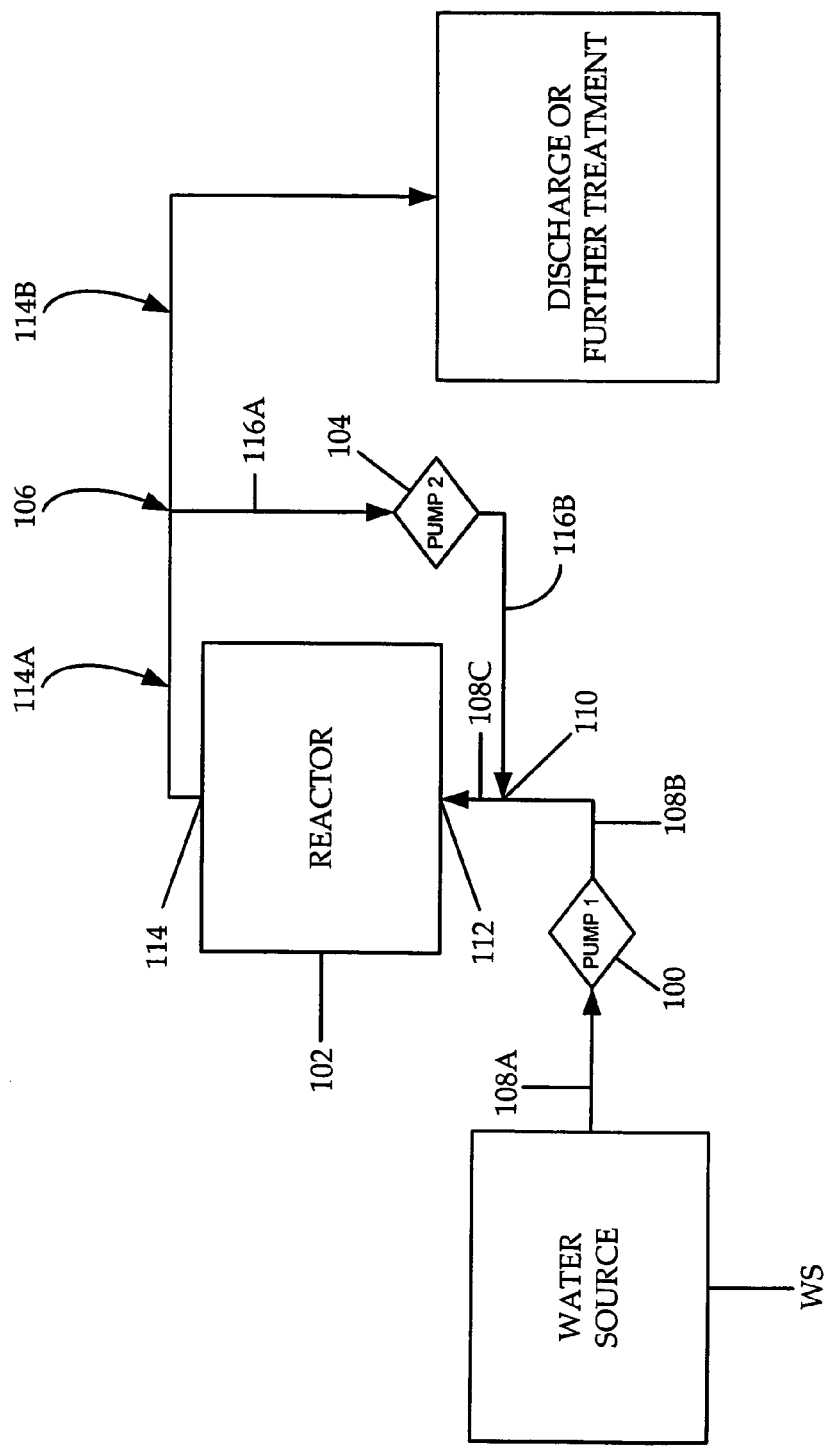
FIGS. 9 and 10 are block diagrams of Applicants' novel recirculation pump and recirculation loop for use with a wastewater reactor.

Turning now to FIG. 9, Applicant discloses a vessel or other source of water (WS), the water being industrial and/or biological and/or other form of water that may contain contaminants that include organic and/or inorganic compositions. The water may be used in agricultural, industrial, domestic treatment or processing of other material, such as sugar cane juice. It may be any water whose physical, chemical and/or biological characteristics may be altered by electrocoagulation. It is seen that there is an intake pipe having several sections (108A, 108B and 108C) for carrying water from the water source into a reactor (102), typically an electrocoagulation reactor. In line with the intake pipe may be an upstream pump (100), upstream of the reactor or the reactor may simply be lower than the water source, the "head" providing impetus to the movement of water to the reactor. The intake pipe may include a section (108A) between the water source (WS) and the upstream pump (100). A second section of intake pipe (108B), may be located between an upstream pump (100) and a T Junction or other junction (110). Finally there may be a section of intake pipe (108C) between the T Junction or other junction and an intake port (112) of the electrocoagulation reactor (102).

The upstream pump (100) may be used to flood the reactor and provide for water fluid flow through the reactor or the "head" of the water source may serve the same function. The reactor also has an outlet port (114) and outlet pipe sections (114A and 114B). Water leaves the electrocoagulation reactor at outlet port (114). Some of the water will be recirculated by exiting the outlet pipe at recirculation junction (106), being drawn by a recirculation pump (104) through a recirculation loop (116). Recirculation loop (116) may include pipe section (116A) upstream of recirculation pump (104) and a recirculation pipe section (116B) downstream of recirculation pump (104). Recirculation pipe section (116B) joins the intake pipe downstream of upstream pump (100) (if any) and upstream of intake port (112), here at junction (110).

Figure 10:
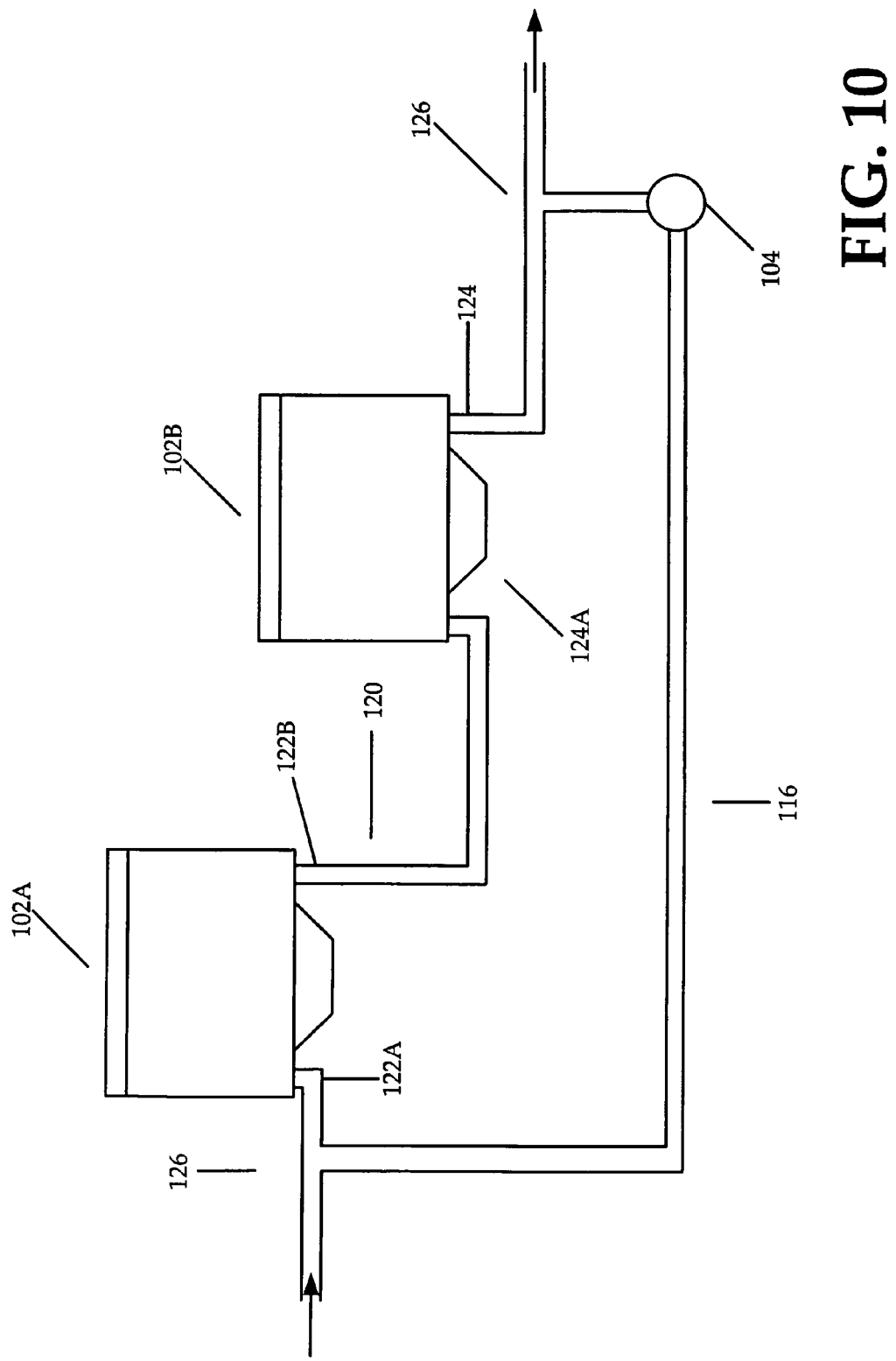

FIG. 10 illustrates an alternate preferred embodiment of Applicants' novel recirculation loop here being illustrated in use with a reactor comprising two cells, first cell (102A) and second cell (102B). These cells may be either a series flow reactor cell or Applicants' novel parallel flow reactor cell disclosed herein. Here it is seen that Applicants provide a pipe or channel (120) connecting the two cells. The first cell (102A) has an inlet (122A) and an outlet (122B). Second cell (102B) has an inlet (124A) and an outlet (124B). Pipe (120) connects the outlet of the first cell to the inlet of the second cell. Downstream of the outlet of the second cell is a T-junction (126) at which water may be recirculated through recirculation loop (116) under the impetus of recirculation pump (104) to a point upstream of inlet (122A) of first reactor (102A). Note that this embodiment illustrates flow through the reactor cells under the impetus of gravity or a "head" between a water source (not shown) which is higher than the first cell, and the first cell which is higher than the second cell. Water continuing downstream of T-junction (126) will continue on for either use discharge, or further treatment, as in settlement, clarification, gas assisted flotation or the like.

One of the purposes in the parallel flow reactor of providing a recirculation loop is to increase the probability of an ion of waste composition being adjacent an oppositely charged plate. In pressurized reactors (such as Applicants' series flow reactor), sufficient velocity of liquids through the reactor must be maintained for proper removal or scrubbing of the plates of the reactor. On the other hand, in Applicants' parallel flow reactor, which is typically run at atmospheric pressure, sufficient flow is necessary to increase the opportunity of a charged ion to be adjacent an oppositely charged plate.

One way in which a recirculation loop may be used is to replace the requirement for multi-cell electrocoagulation reactor. For example, if a treatment job may require 200 g.p.m. through two cells, one following the other (see FIG. 10) for effective treatment. A single cell with a recirculation loop may achieve equivalent effective treatment of the two cell unit.

Applicants discloses in FIGS. 11A, 11B, 12A and 12B an invention relating to a gas-assisted flotation process and apparatus to assist in the separation of solids and liquids from a slurry, such as a slurry that would come out of an electrocoagulation reactor cell. Such invention may be used to treat wastewater or any other water or fluid that may be used in or result from a manufacturing process. Applicants provide an apparatus and process by which water received from an electrocoagulation cell may be treated on a continuous basis for the separation of solids therefrom. For example, water may be treated to remove silicon therefrom for use in the process of manufacturing brown sugar. Indeed, none of the inventions and processes set forth in this application need be confined to "wastewater," but can be applied to the treatment of any water whose characteristics are intended to be altered such as for example, by treatment in an electrocoagulation reactor. The disclosed invention and process may be used downstream of any electrocoagulation cell or other treatment apparatus, including an electrocoagulation reactor with parallel flow or series flow. Further, some water may be passed through the gas-assisted flotation process and apparatus more than once, as by using Applicants' novel recirculation loop. Under some circumstances, Applicants' novel gas-assisted flotation process and apparatus may replace the defoam, sludge, thickener and clarifier processes and apparatus.

Applicants' novel apparatus, a gas-assisted flotation cell, is provided which has a conical upper chamber that tapers into a neck portion, which neck portion may include a manifold with gas intake jets to assist in lifting and propelling floated solids residing above a liquid level, out of a removed end of the neck for discarding or for further treatment, as liquid is drawn off the bottom of the main chamber for either reuse or further treatment.

Applicants' gas-assisted flotation cell provides advantages not found in the prior art, including U.S. Pat. No. 5,055,184 (Carpenter, et al. 1991), the specifications and drawings of which is incorporated herein by reference. The Carpenter reference discloses generally a gas-assisted flotation apparatus for separating solids from liquids in a slurry. It comprises a main chamber, an inlet channel from which a liquid slurry may enter, and an upper tapered portion. Gas bubbles attached to solids and particles will tend to float upward in the main chamber and reside above a liquid line. When the level of liquid is sufficiently high in the chamber, the material floating above the liquid line will either drop off through a side exit pipe above the tapered chamber or, if a gas, will rise upward as through a chimney. Thus, the Carpenter reference discloses two exits ports for expelling material rising above a liquid surface and, in addition, requires a valve mechanism to control the level of liquid in the main chamber.

Among the advantages of Applicants' present invention over the Carpenter reference is the positive removal, as by compressed gas, of floating solid material out of a removed end of a neck that is in fluid communication with the opening at the apex of the tapered walls of the upper chamber. Further, Applicants provide a simple method of maintaining a liquid level in the main chamber sufficient to present material floating above such level to the compressed gas injected into the neck of the main chamber. Further, Applicants provide a novel tapered lower chamber for collection of sediment therein and, further, for a novel stilling chamber suspended within the main chamber. This and other novel features of Applicants' gas-assisted flotation process and apparatus will be apparent with reference to the drawings below.

Figure 11A:
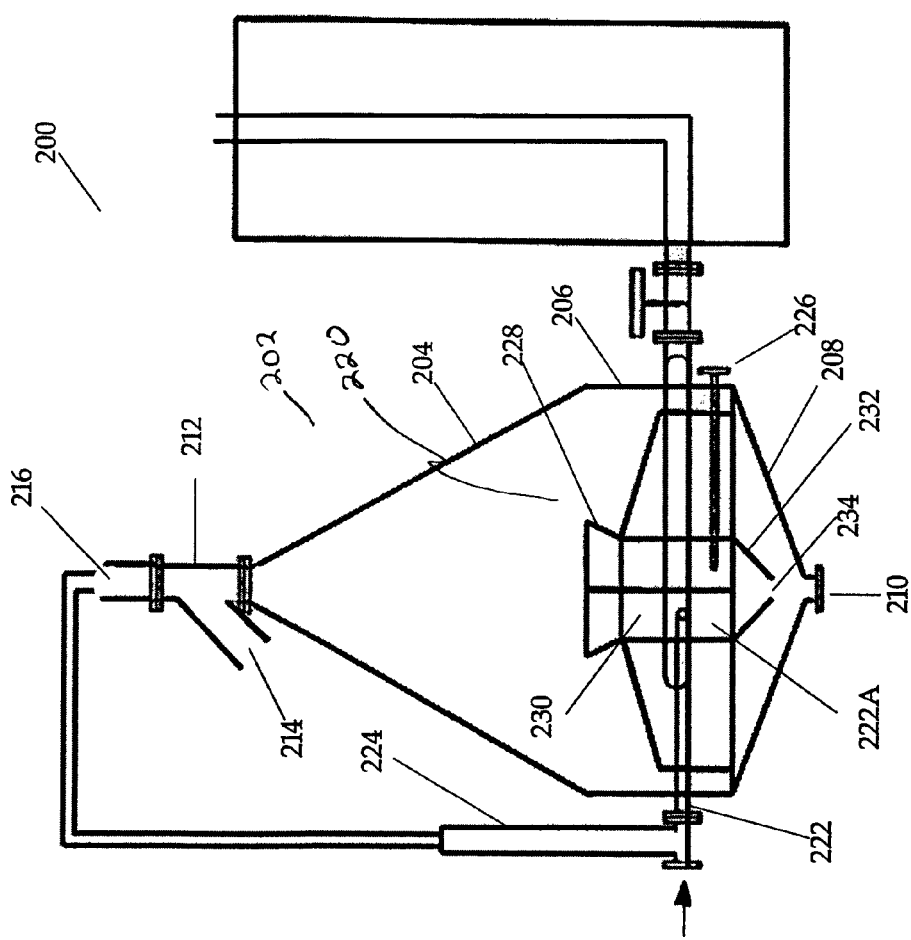
FIGS. 11A and 11B are side and bottom elevational views of a dissolved air floatation cell for use with Applicants' electrocoagulation reactor.
Figure 11B:
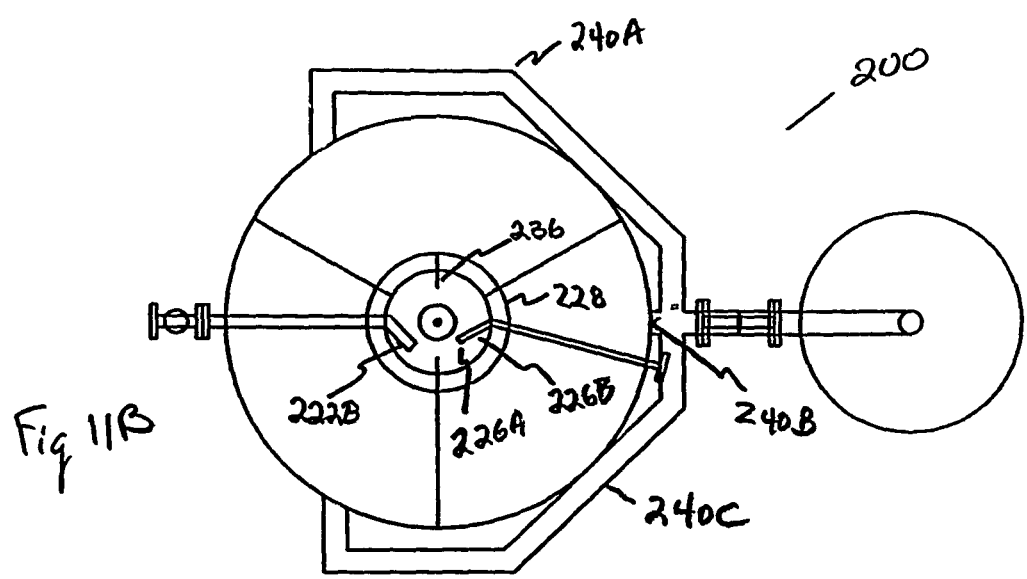
Figure 12A:
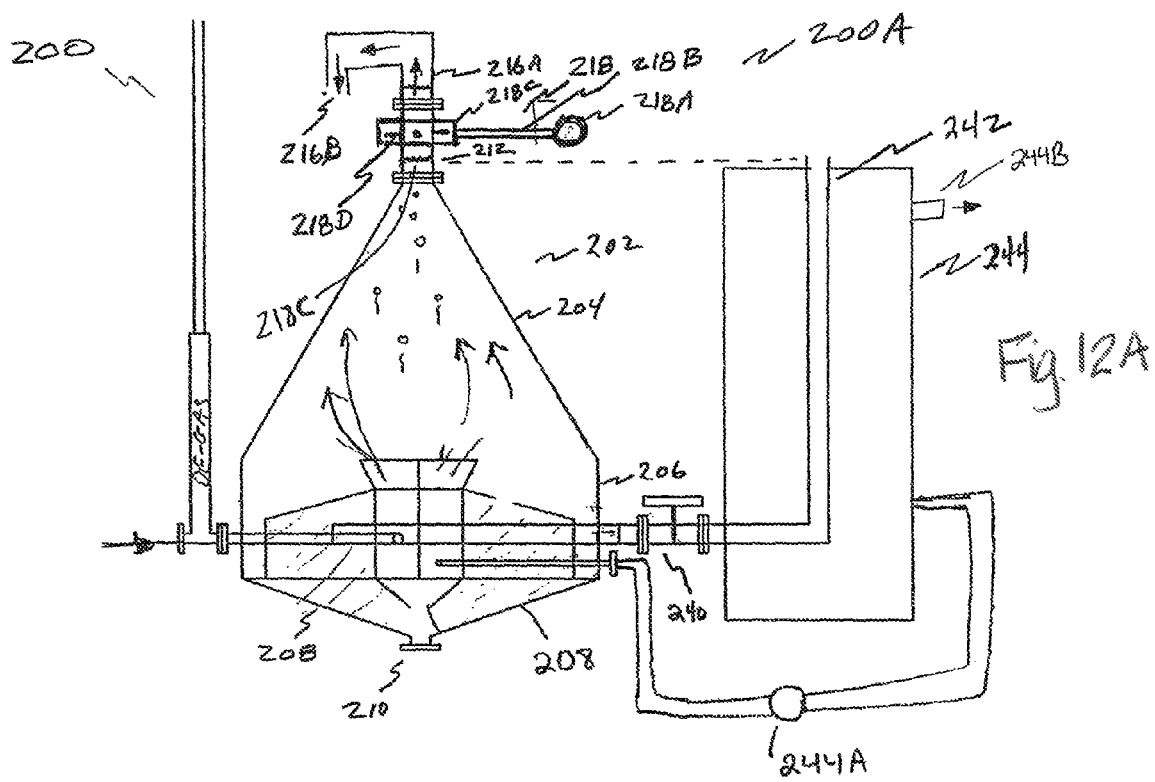
FIGS. 12A and 12B are alternate preferred embodiments of a dissolved air floatation cell for use with Applicants' waste treatment process.
Figure 12B:
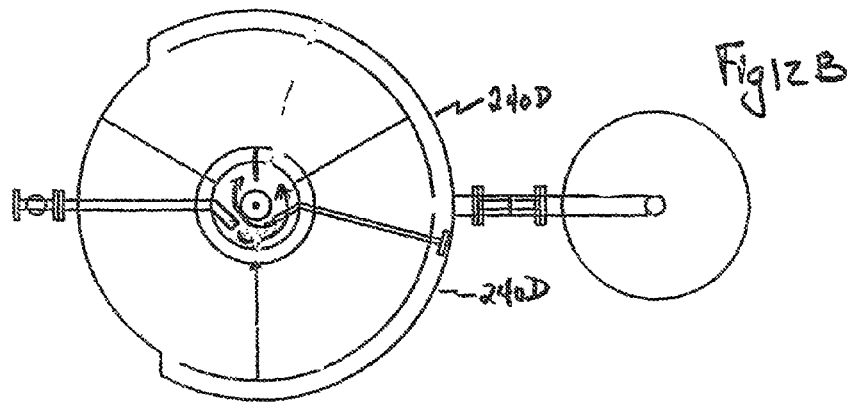

FIGS. 11A and 11B illustrate a dissolved air flotation apparatus 200 and FIGS. 12A and 12B show an alternate preferred embodiment, dissolved air flotation apparatus 200A.

The figures illustrate a main chamber 202 including a tapered upper chamber 204. Main chamber 202 includes vertical sidewalls 206. Applicants provide a tapered lower chamber 208 which descends below the vertical sidewalls 206 and terminates in a drain 210 that may have a plug, removable therefrom, for the draining of sediment that may collect thereon. Tapered upper or lower chambers may be conical or polygonally shaped.

Turning back to the upper chamber, it is seen that tapered upper chamber 204 reaches an apex that is open and in fluid communication with a neck 212. In FIGS. 11A and 11B, it is seen that Applicants provide a sideport 214 for removal, as by descent under the impetus of gravity, of solids floating on the top of a liquid/solids interface. In FIGS. 11A and 11B, it is seen that there is a removed neck opening 216 for the escape of gases therefrom. However, turning to FIGS. 12A and 12B, it is seen that Applicants may provide, at a suitable location, as for example in the neck 212 (alternatively directly in the walls of tapered upper chamber 204), an air injector assembly 218. The purpose of the air injector assembly is to inject air, or other gas, at a suitable location, such as in the neck, to assist in lifting the solids and the gases entrapped in the solid/liquid froth that is "floating" above the liquid interface, out of a removed end (216B) of a transport tube 216A which may transport the air charged mix. Applicants' air-injected assembly includes a compressed gas source 218A (for example, an air pump or a compressed air tank) and a delivery tube 218B for delivery of a gas, under pressure to a manifold 218C, which manifold is in fluid communication with one or more jet 218D or pressure ports for injecting the air or other gas under compression into the neck of the main chamber and into a solid/gas froth for removal from the removed end (216B) of transport tube 216A.

Applicants' novel gas-assisted flotation apparatus 200, 200A may include a stilling chamber 220, the stilling chamber including an inlet tube 222 for carrying a liquid, typically with a flocculant or precipitant suspended therein into the stilling chamber. Applicants' inlet tube 222 may be seen to have an open removed end 222A, and, adjacent a removed end an angled portion 222B for directing the flow of liquids into the stilling chamber so as to generate a slow, non-turbulent flow within the chamber. Upstream of the point at which the inlet tube enters the main chamber, there may be a degas vent or pipe 224 from which the larger gas bubbles may escape from the liquid before it enters the main chamber. Entering the stilling chamber 220 through a dissolved air delivery tube 226 is a compressed gas liquid composition. The dissolved air delivery tube includes a removed end 226A which may include an angled portion 226B in an effort to assist in the circulation of the fluid in the main chamber to avoid turbulence. Indeed, the function of stilling chamber 24 is to reduce the velocity of liquid entering the chamber to a point of slow, smooth flow. Stilling chamber 220 also is intended to increase retention time to allow further coagulation, flocculation and gas bubble precipitation as well as a growth of flocculant solid particles. Note that stilling chamber 220 may include a flanged lip 228 adjacent an upper opening thereof and a sloped bottom wall 232, the flanged lip and sloped bottom wall connected by vertical sidewalls 230. The effect of the flanged lip and/or sloped bottom wall is to promote a smooth, slow flow of the liquid and thus provide increased efficiency. Notice that open bottom 234 of stilling chamber 220 may be located above drain 210 so as to "allow" any precipitates descending therefrom to travel toward the drain. Note also that the sidewalls of the stilling chamber may include an interior baffle 236 projecting into the stilling chamber so as to reduce the flow of liquids therein to, again, promote a smooth non-turbulent slow flow of liquid. Furthermore, the stilling chamber may be supported within the main chamber, above the floor of the main chamber by chamber support baffles 238 extending from an inner surface of the vertical sidewalls of the main chamber to the sidewalls of the stilling chamber, the support baffles having an exaggerated width (vertical dimension) so as to help minimize currents in the main chamber.

The main chamber must be provided with a means to remove a liquid therefrom, the liquid here being removed by outlet channel assembly 240 which may consist of a single pipe, having multiple branches 240A, 240B and 240C (see FIGS. 11A and 11B) or a jacket assembly 240D (see FIGS. 12A and 12B). By providing for multiple outlets at or near the bottom of main chamber 202, Applicants provide for a more efficient removal of liquid from the gas-assisted flotation apparatus 200, 200A. While three branches are illustrated in FIG. 11B, any number may be used.

Applicants may also provide a standing pipe 242 with a catch vessel 244 from which liquid removed from the main chamber through outlet channel assembly 240 may be contained, for the control of the level of liquid in main chamber 202 and as a source of water for the air dissolving mechanism.

So long as fluid to be treated is allowed to enter chamber, the fluid will rise to the level of the top of standing pipe 242. This level may be adjusted to coincide with the level of the bottom of the sideport 214 or to a level just below jets or pressure ports 218D, or to any both appropriate for the density of the floating phase.

Thus, Applicants provide a novel gas-assisted flotation process and apparatus that achieves at least the following results: reduction of turbulence; effective removal of gas/solid material through a removed neck opening; effective maintenance of fluid level adjacent a gas or compressed air transport tube; an effective drain to remove precipitates; the angled injection of fluid into a stilling chamber and gas dissolved air from a separate tube into a stilling chamber, the stilling chamber being effectively designed to help reduce turbulence. Dissolved gas is injected through dissolved air delivery to be 226. Water is drawn off the bottom of catch vessel 244. Air pump 244A will inject air into the stream of fluid injected into the stilling chamber. Outlet port 244B will pass water on for further treatment or use.

Thus, applicants provide a method of transporting a quantity of water from a removed location to an electrocoagulation reactor, moving the water through the electrocoagulation reactor while subjecting the water to an electric field, then discharging the waste water from the electrocoagulation reactor through a discharge port. Downstream the discharge port and inline with discharge piping is a recirculation loop that includes a pump for recirculating a portion of the water back into the electrocoagulation reactor by reintroducing the waste water that is already passed through the reactor at least once upstream of the inlet port of the reactor.

We claim:

1. A method for treating water, the method comprising the steps of:
    providing a multiplicity of plates;
    providing a cartridge adapted to removably receive a multiplicity of plates so as to maintain the plates in parallel alignment;
    providing an electrocoagulation reactor, the electrocoagulation reactor having a cell tank adapted to receive the cartridge, the cell tank having an intake pipe, the intake pipe having a first pump engaged therewith and an intake port and a discharge pipe and a discharge port;
    loading the cartridge with at least some plates;
    placing the loaded cartridge into the cell tank;
    transporting a quantity of water from a distant location to the intake port of the electrocoagulation reactor via the intake pipe and the first pump;
    subjecting the water in the reactor to an electric field;
    moving the water through the electrocoagulation reactor;
    removing the cartridge from the electrocoagulation; and
    discharging the water from the electrocoagulation reactor to the discharge pipe.

2. The method of claim 1 further including the step of:
    defoaming the water discharged from the electrocoagulation reactor.

3. The method of claim 1 further including the step of:
    clarifying the water discharged from the electrocoagulation reactor.

4. The method of claim 1 further including the step of:
    providing a settling tank and allowing the water discharged from the electrocoagulation reactor to reside in the settling tank so that any particulate matter may settle out from the water.

5. The method of claim 1 further including the steps of providing a sludge thickener downstream of the electrocoagulation reactor and residing the water discharged from the electrocoagulation reactor in the sludge thickener for thickening any sludge contained therein.

6. The method of claim 1 wherein, following discharging the water from the electrocoagulation reactor, the water goes to a second electrocoagulation reactor for subjecting the water to an electric field in the second electrocoagulation reactor.

7. The method of claim 1, wherein the cell tank has an open top and the placing and removing steps are accomplished through the open top.

8. The method of claim 1, wherein the electrocoagulation includes a second cell placed in series with the first cell.

9. The method of claim 1, wherein the cartridge includes a multiplicity of slots each dimensioned to receive a plate.

10. The method of claim 1, wherein the cell tank includes a sump portion and further including the step of removing waste from the sump portion.

11. The method of claim 1, further providing handling straps for engaging the cartridge to assist in the loading and removal steps.

12. The method of claim 1, wherein the step of providing a multiplicity of plates includes providing at least some of the multiplicity of plates having a shorter height than other of the multiplicity of plates and wherein the loading steps includes loading some of the multiplicity of plates having a shorter height.

\* \* \* \* \*